(12) United States Patent
Arita et al.

(10) Patent No.: US 8,265,867 B2
(45) Date of Patent: Sep. 11, 2012

(54) ROUTE SEARCH SYSTEM

(75) Inventors: Hidekazu Arita, Tokyo (JP); Makoto Ohi, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 753 days.

(21) Appl. No.: 12/083,514

(22) PCT Filed: Sep. 14, 2006

(86) PCT No.: PCT/JP2006/318285
§ 371 (c)(1),
(2), (4) Date: Apr. 11, 2008

(87) PCT Pub. No.: WO2007/080674
PCT Pub. Date: Jul. 19, 2007

(65) Prior Publication Data
US 2009/0254267 A1  Oct. 8, 2009

(30) Foreign Application Priority Data

Jan. 13, 2006 (JP) ................................ 2006-006601

(51) Int. Cl.
*G01C 21/34* (2006.01)
(52) U.S. Cl. .................... 701/410; 701/533; 340/995.19
(58) Field of Classification Search .................. 701/201, 701/410, 409, 408, 420, 533; 340/995.19, 340/995.21; *G01C 21/34, 21/36*
See application file for complete search history.

(56) References Cited

U.S. PATENT DOCUMENTS 5,179,653 A * 1/1993 Fuller ............................ 715/840
5,765,123 A * 6/1998 Nimura et al. ................ 701/208
(Continued)

FOREIGN PATENT DOCUMENTS

DE  697 30 176 T2  8/2005
(Continued)

OTHER PUBLICATIONS

Jihui Zhang, Yunnan Wu, Qian Zhang, Bo Li, Wenwu Zhu, Sun-Yuan Kung, "Mobility assisted optimal routing in noninterfering mobile ad hoc networks", Publication Year: 2004 , pp. 30-34.*

(Continued)

*Primary Examiner* — Tuan C. To
(74) *Attorney, Agent, or Firm* — Birch, Stewart, Kolasch & Birch, LLP

(57) ABSTRACT

A route search system includes a map data storing means 2 storing a roadmap data containing, as the attribute of a road, whether the road is a road located within a flat-rate pay area where a fixed fare is charged on a mobile unit regardless of the number of times the mobile unit enters the area if the entries are made within a fixed time period; a flat-rate pay area transit recording means 4b, when the current position detected by a position detecting means 1 comes to a road in the flat-rate pay area represented by the attribute of the roadmap data stored in the map data storing means, storing that the mobile unit has transited the flat-rate pay area; an input means 3 inputting whether to permit transit across the flat-rate pay area; and a route calculating means 4a, when it is inputted by the input means that the transit thereof is not permitted, if the flat-rate pay area transit recording means stores that the mobile unit has transited the flat-rate pay area, calculating the optimum route to the destination within routes also containing roads located within the flat-rate pay area on the basis of the roadmap data stored in the map data storing means.

2 Claims, 2 Drawing Sheets

U.S. PATENT DOCUMENTS

| | | | |
|---|---|---|---|
| 6,487,494 B2 * | 11/2002 | Odinak et al. | 701/420 |
| 7,256,711 B2 * | 8/2007 | Sheha et al. | 340/995.1 |
| 7,532,976 B2 * | 5/2009 | Hartinger | 701/207 |
| 7,680,596 B2 * | 3/2010 | Uyeki et al. | 701/210 |
| 2006/0069501 A1 * | 3/2006 | Jung et al. | 701/209 |
| 2006/0129315 A1 * | 6/2006 | Kanematsu | 701/210 |
| 2006/0206261 A1 * | 9/2006 | Altaf et al. | 701/209 |
| 2006/0241854 A1 * | 10/2006 | Tu et al. | 701/202 |
| 2006/0265125 A1 * | 11/2006 | Glaza | 701/210 |
| 2006/0287816 A1 * | 12/2006 | Bardsley et al. | 701/209 |
| 2007/0038367 A1 * | 2/2007 | Froeberg | 701/202 |
| 2007/0244632 A1 * | 10/2007 | Mueller et al. | 701/202 |
| 2008/0114542 A1 * | 5/2008 | Nambata et al. | 701/209 |
| 2008/0154489 A1 * | 6/2008 | Kaneda et al. | 701/201 |
| 2008/0189029 A1 * | 8/2008 | Hayot et al. | 701/201 |

FOREIGN PATENT DOCUMENTS

| | | | |
|---|---|---|---|
| EP | 1 279 925 A2 | | 1/2003 |
| JP | 09280880 A | * | 10/1997 |
| JP | 11-183188 A | | 7/1999 |
| JP | 3446555 B2 | | 7/2003 |
| JP | 2004354204 A | * | 12/2004 |
| JP | 2005-274213 A | | 10/2005 |
| JP | 2005291768 A | * | 10/2005 |
| JP | 2005345299 A | * | 12/2005 |
| JP | 2006-153559 A | | 6/2006 |

OTHER PUBLICATIONS

Mikawa, M., Sekine, M., Kubota, K, "Designing cost function for finding optimal delivery route in logistics", vol. 5, Publication Year: 2002, pp. 2883-2884 vol. 5.*

* cited by examiner

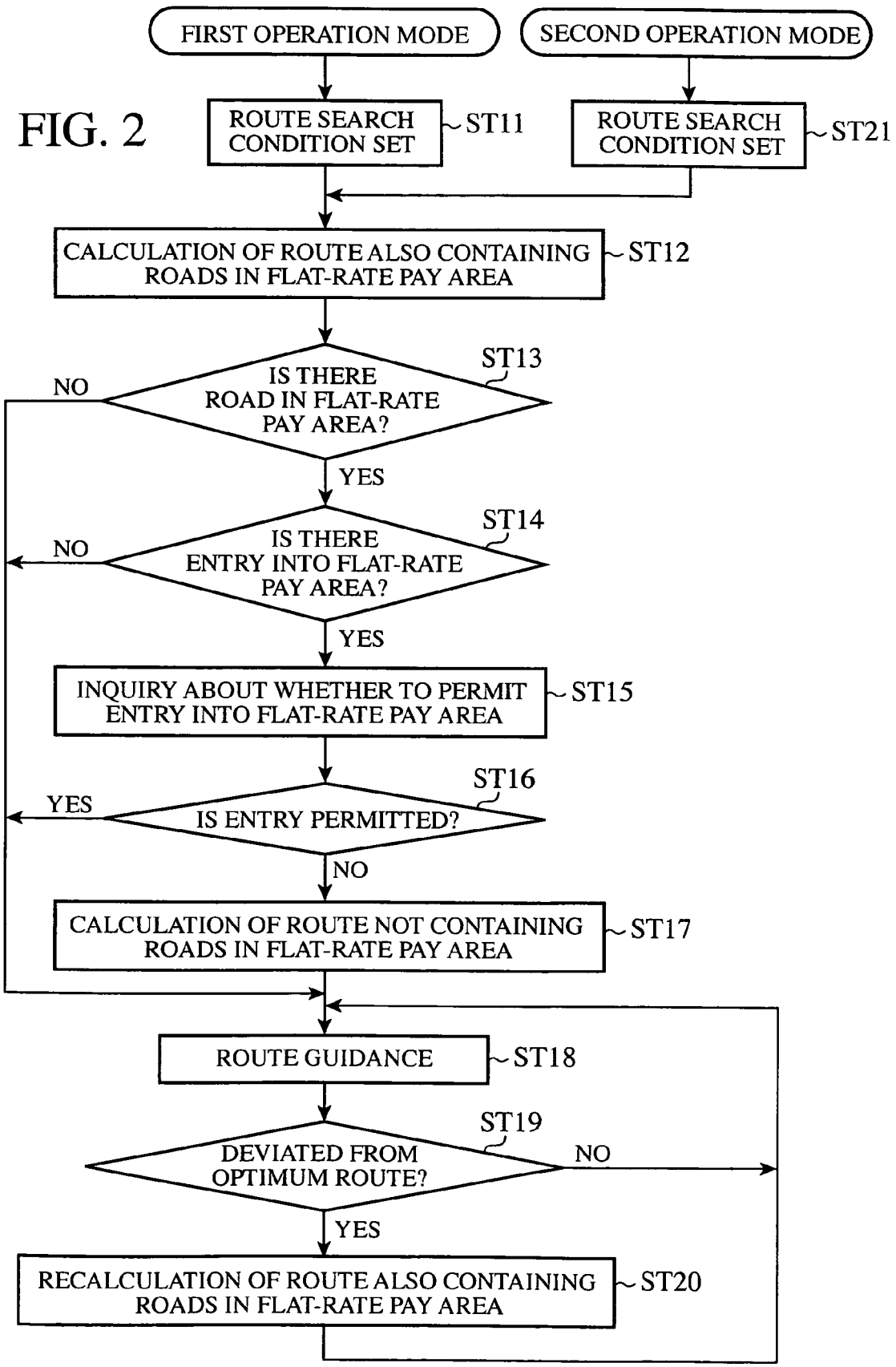

ROUTE SEARCH SYSTEM

Cross Reference to Related Applications:

This nonprovisional application claims the benefit of U.S. Provisional Application No. 2006-006601 filed on Jan. 13, 2006 and of Japanese Patent Application No. 2007-553829 filed in Japan, on Mar. 5, 2008. The entire contents of all of the above applications is hereby incorporated by reference.

TECHNICAL FIELD

The present invention relates to a route search system making a search for the optimum route from a current position to a destination, and more particularly to a technology for making a route search by controlling a toll charged in an area where a pay area of a flat-rate system is established (hereinafter referred to as a "flat-rate pay area").

BACKGROUND ART

Conventionally, there has been known a route search system making a route search by controlling the tolls of toll roads, and so on. For example, Patent Document 1 discloses a route search system capable of preventing anew using the same line within a flat-rate toll road section. The route search system makes a search for a route to the destination on the basis of roadmap data provided with data on a flat-rate section in the attribute of each road link. Further, the system extracts flat-rate toll road links from among road links constituting the searched route, moreover, searches the extracted flat-rate toll road links to thereby detect reuse of the same line therein, and changes the searched route having a road section including the reuse of the same line to a route choosing only the flat-rate toll road. Thus, duplicate payments of the fare can be prevented.

Incidentally, in recent years, in order to reduce the inflow of vehicles to cities to relieve congestion, reduce travel time, and improve the environment, the introduction of a road pricing system establishing flat-rate pay areas and charging vehicles passing through the areas has been promoted. The road pricing system is a system that decides "Toll Time Period," "Toll Object," "Charging Amount," and "Toll Zone," and charges vehicles subject to regulations by the decision. For example, the road pricing system introduced in London in the U. K. decides that the toll time period is from 7:00 am to 6:30 pm, every weekday (except national holidays), the toll objects are vehicles driven or parked on public roads in the toll zone, the fare is £5 a day not depending on the type of vehicle (buses, taxies, two-wheel vehicles, and emergency vehicles are excepted from the regulation), and the toll zone is Central London.

Patent Document 1: Japanese patent No. 3446555

The route search system disclosed in Patent Document 1 as mentioned above is effective in saving the fare charged to a user in a system charging the user by the number of times the user takes a uniform-rate pay area; however, as in the case of the road pricing system of London, in the case of a system where the amount of money charged is fixed per day and a fixed fare is charged regardless of the number of times a mobile unit enters the area if the entries are made within the fixed period of time, there is a problem that a search of the optimum route where the fare is controlled cannot be implemented.

The present invention has been made to solve the above-mentioned problems, and an object of the present invention is to provide a route search system capable of making a search of the optimum route by controlling bearing of fares when a user employs a flat-rate pay area where a fixed fare is charged regardless of the number of times employed by the user in a fixed period of time.

DISCLOSURE OF THE INVENTION

The route search system according to the present invention, includes a map data storing means which stores a roadmap data containing, as the attribute of a road, whether the road is a road located within a flat-rate pay area where a fixed fare is charged on a mobile unit transiting the area regardless of the number of times the mobile unit transits the area if the transits are made within a fixed time period; a position detecting means which detects the current position of the mobile unit; a flat-rate pay area transit recording means which stores that the mobile unit has transited the flat-rate pay area, when the current position detected by the position detecting means comes to a road located within the flat-rate pay area represented by the attribute of the roadmap data stored in the map data storing means; an input means which inputs whether to permit the transit of the flat-rate pay area; and a route calculating means which calculates the optimum route to the destination within routes also including roads within the flat-rate pay area on the basis of the roadmap data stored in the map data storing means, when it is inputted by the input means that the transit of the flat-rate pay area is not permitted and if the flat-rate pay area transit recording means stores that the mobile unit has transited the flat-rate pay area.

According to the present invention, the search of the optimum route where the fares are controlled can be implemented because it is arranged as follows:

In the case of making a route search by using a roadmap data containing the data of a flat-rate pay area where a fixed fare is charged on a mobile unit transiting the area regardless of the number of times the mobile unit enters the area within a fixed period of time, when the current position of the mobile unit comes to a road within the flat-rate pay area represented by the attribute of the roadmap data, it is previously stored that the mobile unit has transited the flat-rate pay area; then, when it is instructed that the transit of the flat-rate pay area is not permitted in the route search and if it has been stored that the mobile unit has already transited the flat-rate pay area within a fixed period of time, the optimum route to the destination is calculated within routes also including roads within the flat-rate pay area.

BRIEF DESCRIPTION OF THE DRAWINGS

FIG. 2 is a flowchart showing the operation of the route search system in accordance with the first embodiment of the present invention.

BEST MODE FOR CARRYING OUT THE INVENTION

Figure 1:
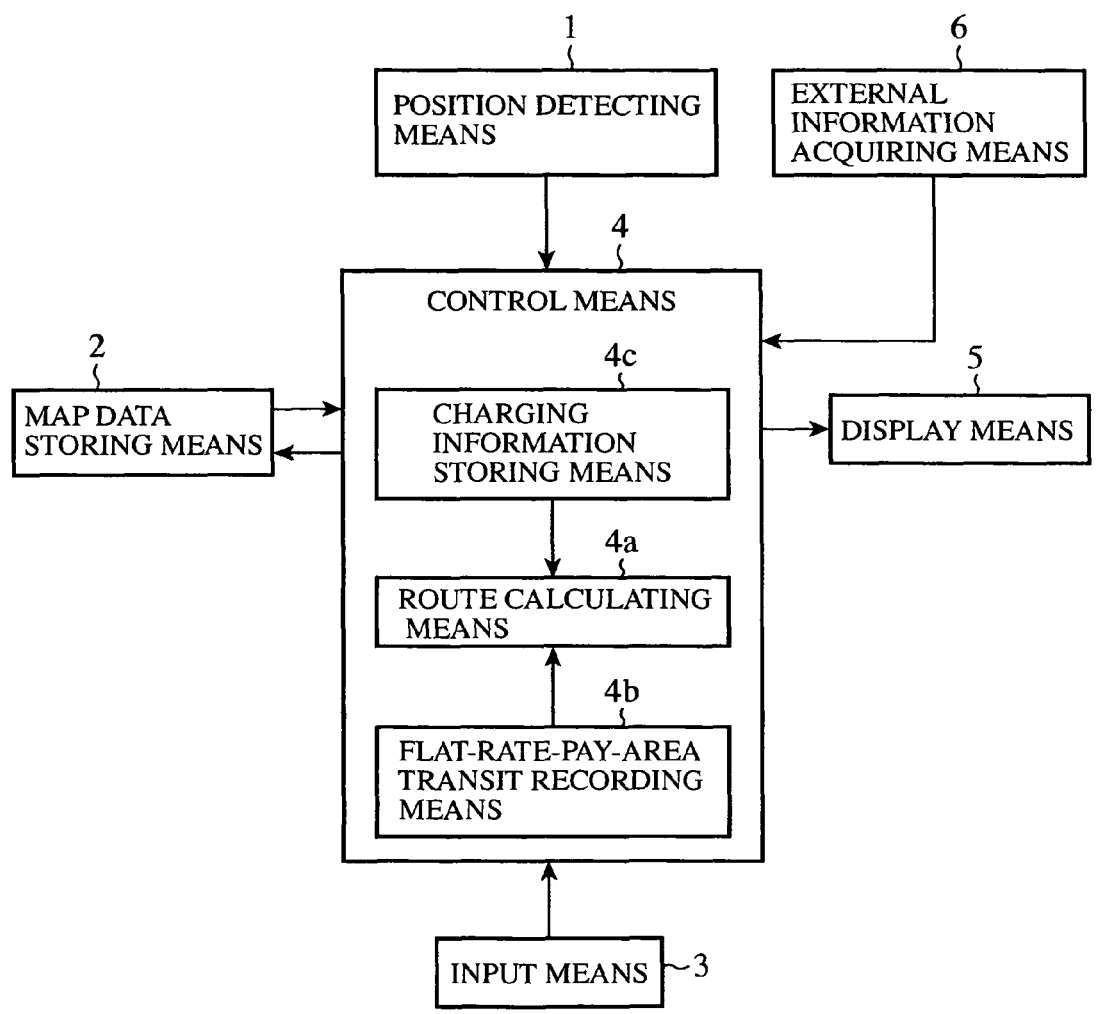
FIG. 1 is a block diagram showing the configuration of a route search system in accordance with the first embodiment of the present invention.

Embodiments of the present invention will now be described with reference to the accompanying drawings in order to explain the present invention in more detail.

FIRST EMBODIMENT

FIG. 1 is a block diagram showing the configuration of a route search system in accordance with the first embodiment of the present invention. The route search system is composed of a position detecting means 1, a map data storing means 2, an input means 3, a control means 4, a display means 5, and an external information acquiring means 6.

The position detecting means 1 is composed of, for example, a GPS (Global Positioning System), a gyro sensor, and a speed sensor and so on, and detects a user's current position. The user's current position detected by the position detecting means 1 is transmitted to the control means 4 as current position data.

The map data storing means 2 is composed of a storage medium such as a DVD (Digital Versatile Disk) and a HDD (Hard Disk Drive), and stores roadmap data. The roadmap data is provided with attribute information showing whether the road indicated by the roadmap data is a road located within a flat-rate pay area. In this connection, the map data storing means 2 stores facilities data, and so on, in addition to the roadmap data; however, since they are not directly connected with the present invention, these detailed explanation is omitted. The information stored in the map data storing means 2 is read out by the control means 4, and the control means writes information thereinto as required.

The input means 3 is composed of, for example, a remote controller, a touch panel, a speech input system and so on, and receives instructions from a user. The input means 3 is used for a user to input the destination, set the route search condition, and instruct whether to permit a transit across a flat-rate pay area, for example. The data acquired by receiving the user instruction by the input means 3 is transmitted to the control means 4 as input data.

The control means 4 is composed of a microcomputer, for instance, and controls the entire route search system. The control means 4 includes a route calculating means 4a, a flat-rate pay area transit recording means 4b, and a charging information storing means 4c.

The route calculating means 4a calculates the optimum route from the current position of a mobile unit indicated by the current position data sent from the position detecting means 1 to the destination input from the input means 3. The calculation of the optimum route is performed according to a route search condition and an instruction as to whether to permit the transit of a flat-rate pay area, inputted from the input means 3; information on whether a mobile unit has transited the flat-rate pay area that is stored in the flat-rate pay area transit recording means 4b; and the charging information stored in the charging information storing means 4c. The optimum route data representing the optimum route and calculated by the route calculating means 4a is transmitted to the display means 5.

The flat-rate pay area transit recording means 4b stores whether the mobile unit has transited the flat-rate pay area within a fixed period of time. Specifically, when the current position detected by the position detecting means 1 comes to a road located within the flat-rate pay area represented by the attribute of the roadmap data stored in the map data storing means 2, the flat-rate pay area transit recording means 4b stores that the mobile unit has transited the flat-rate pay area.

The charging information storing means 4c is composed of, for example, a flash memory and so on, and stores the charging information acquired by the external information acquiring means 6. The charging information contains "Toll Time of Day" denoting the period of time of a fare to be charged, "Toll Object" deciding which vehicle type to be charged, "Charging Amount" denoting the amount of money to be charged, and "Toll Zone" denoting the area range to be charged. Note that when the map data storing means 2 is composed of a writable storing device such as a HDD, the charging information storing means 4c may be provided in the map data storing means 2.

The display means 5 is composed of, for example, an LCD, and displays maps and various messages according to the display data sent from the control means 4 to thereby present various information to the user. For example, the display means 5 displays the optimum route on the map according to the optimum route data sent from the route calculating means 4a of the control means 4 as display data.

The external information acquiring means 6 is composed of, for example, a wireless communication equipment and a removable storing device and so on; acquires charging information such as information on the change of the "toll time period" (charging time period) of a flat-rate pay area; and updates the data stored in the charging information storing means 4c.

The operation of the route search system according to the first embodiment of the present invention arranged as described above will next be explained below. It should be noted that it is assumed that when a plurality of drivers use one mobile unit, the route search system has the function of being able to calculating routes on different route search conditions according to the users' setting, and hereinafter, the system has a first operation mode to be employed by a user and a second operation mode employed by another user.

First, when a vehicle mounted with the route search system goes into a flat-rate pay area, the entry and the entering time are stored in the flat-rate pay area transit recording means 4b. Specifically, when it is judged that the current position denoted by the current position data and sent from the position detecting means 1 contributes to a road located within the flat-rate pay area shown by the attribute of the roadmap data stored in the map data storing means 2, the control means 4 stores a fact that the mobile unit has transited the flat-rate pay area, and also stores the current time acquired from a watch mechanism (not depicted) as the entering time in the flat-rate pay area transit recording means 4b. The above-described operations are always carried out separately from the route calculation.

Note that even if a driver unintentionally enters the flat-rate pay area, upon detecting that the mobile unit goes into the flat-rate pay area, the control means 4 stores the entry in the flat-rate pay area transit recording means 4b.

The route calculation process to be carried out in the route calculating means 4a will now be described in detail with reference to the flowchart as shown in FIG. 2. When a user starts the route calculation process in a first operation mode, first of all, the route search condition is set (step ST11). Specifically, the destination, the route search condition, and the input data representing whether to permit the transit of the flat-rate pay area, which are all inputted by using the input means 3, are sent to the control means 4.

Then, route calculations are performed within routes also containing roads within the flat-rate pay area (step ST12). Specifically, the route calculating means 4a of the control means 4 calculates the optimum route from the current position indicated by the current position data sent from the position detecting means 1 to the destination inputted by using the input means 3 according to the route search conditions inputted from the input means 3, the instruction whether to permit the transit of the flat-rate pay area, and the charging information stored in the charging information storing means 4c.

Then, it is checked whether the route calculated in step ST12 contains roads located in the flat-rate pay area (step ST13). In step ST13, when it is judged that the route contains no road within the flat-rate pay area, routes not passing through roads in the flat-rate pay area do not need to be considered, thereby proceeding to the step ST18 in the sequence, and guidance is started with the route calculated in step ST12 as the optimum route.

Otherwise, in step ST13, when it is judged that the route contains a road located within the flat-rate pay area, then it is checked whether there is the transit of the flat-rate pay area (step ST14). To be specific, the route calculating means 4*a* checks whether both the entering time stored in the flat-rate pay area transit recording means 4*b* and the expected time of arrival at the flat-rate pay area have fallen within the same charging period of time or not. In that case, when the estimation of the expected time of arrival is difficult or impossible, it may be arranged such that the current time is used as the expected time of arrival for purposes of convenience.

In step ST14, if it is judged that there is no entry into the flat-rate pay area, routes not using roads in the flat-rate pay area do not need to be considered, thereby proceeding to the step ST18 in the sequence, and guidance is started with the route calculated in step ST12 as the optimum route. In contrast, in step ST14, when it is judged that there is an entry into the flat-rate pay area, then, an inquiry is made whether an entry into the flat-rate pay area is permitted or not(step ST15).

That is, the route calculating means 4*a* generates a message inquiring whether to permit going into the flat-rate pay area, and sends the message to the display means 5 as display data. With respect to the inquiry, when the user inputs as to whether to permit an entry into the flat-rate pay area by using the input means 3, the input data containing that effect is sent to the route calculating means 4*a* of the control means 4. Note that it may also be arranged that the setting as to whether an entry into the flat-rate pay area is permitted or not be made in advance. In that case, the processing of step ST15 is unnecessary.

Subsequently, it is checked whether the entry into the flat-rate pay area is permitted or not (step ST16). That is, the route calculating means 4*a* checks whether the input data sent from the input means 3 indicates that the entry into the flat-rate pay area is permitted. In step ST16, when it is judged that the entry into the flat-rate pay area is permitted, routes not using roads in the flat-rate pay area don't have to be considered, thereby proceeding to the step ST18 in the sequence, and guidance is started with the route calculated in step ST12 as the optimum route.

Meanwhile, in step ST16, when it is judged that going into the flat-rate pay area is not permitted, the route calculated in step ST12 cannot be used, and thereby a route containing no road within the flat-rate pay area is calculated (step ST17) Thereafter, the process proceeds to step ST18.

In step ST18, route guidance is given along the optimum route where the mobile unit transits the flat-rate pay area, calculated in step ST12, or the optimum route where the unit does not transit the flat-rate pay area that is calculated in step ST17. Further, while giving that route guidance, the route search system checks whether the mobile unit deviates from the optimum route to enter the flat-rate pay area (step ST19). Specifically, the control means 4 checks whether the current position detected by the position detecting means 1 deviates from the optimum route not containing roads located in the flat-rate pay area previously calculated, and comes to a road in the flat-rate pay area.

In step ST19, when it is judged that the current position does not deviate from the optimum route, the process returns to step ST18, and then, the route guidance (step ST18) and the process of checking the presence or absence of deviation from the optimum route (step ST19) are repeatedly given or executed. In the course of the repeated execution, in step ST19, if it is judged that the current position deviates from the optimum route and enters the flat-rate pay area, route recalculations are carried out within routes also containing roads located within the flat-rate pay area (step ST20). Thereafter, the process returns to step ST18, and route guidance is given along the optimum route where the mobile unit passes through the flat-rate pay area.

When a user different from the aforementioned user starts a route calculation process in a second operation mode, first of all, a route search condition is set (step ST21). Specifically, a destination, a route search condition, and input data representing whether to permit passing through the flat-rate pay area, which are all inputted by using the input means 3, are sent to the control means 4. Thereafter, the sequence proceeds to step ST12. The processing subsequent to step ST12 is the same as the one executed in the above-described first operation mode.

In that case, since the flat-rate pay area transit recording means 4*b* is commonly used with the processing in the first operation mode, even if the current driver sets a condition where higher priority is given to a route not transiting the flat-rate pay area in the second operation mode, in the case where the other driver has already passed through the flat-rate pay area in the same period of time in the first operation mode, a route is recalculated within routes also containing roads within the flat-rate pay area. For this reason, if a route transiting the flat-rate pay area is the optimum route, route guidance is given along the route. The optimum route controlling the fare can be presented to the second driver.

As described above, according to the route search system of the first embodiment of the present invention, the optimum route search where the fare is controlled can be achieved as follows: In the case of making a route search by using the data of a roadmap containing a flat-rate pay area where a fixed fare is charged regardless of the number of times a mobile unit enters the area if the entries are made within a fixed period of time, when the current position comes to a road located within the flat-rate pay area represented by the attribute of the roadmap data, it is arranged to previously store that the mobile unit has transited the flat-rate pay area, and when in the route search process it is instructed that the run through the flat-rate pay area is not permitted, if it is stored that the mobile unit has already transited the flat-rate pay area within a fixed period of time, it is arranged such that the optimum route to the destination is calculated within routes also containing roads located in the flat-rate pay area.

Further, when a mobile unit goes into a flat-rate pay area, a driver occasionally unintentionally enters the flat-rate pay area in a system having no toll collecting booth, and automatically observing whether the unit enters the flat-rate pay area by a camera and the like. Even in that case, the route search system detects that the mobile unit has entered the flat-rate pay area by using the position detecting means 1 and the roadmap data stored in the map data storing means 2, and causes the flat-rate pay area transit recording means 4*b* to store that the unit has transited the flat-rate pay area, thus enabling the optimum route where the fare is controlled to be calculated in the route recalculation time.

Moreover, there is a possibility that the charging information stored in the charging information storing means 4*c* is changed depending on the seasonal change or by the change of measures to relieve traffic jams; however, it is arranged such that the information stored in the charging information storing means 4*c* can be updated by acquiring the updated charging information from the external information acquiring means 6, thus enabling quick response to the change of the charging information.

It should be appreciated that, in the route search system according to the first embodiment as described above, when the entry of a mobile unit into a flat-rate pay area and the entering time are stored in the flat-rate pay area transit recording means 4b, the entry thereof and the entering time and so forth can be arranged to be displayed in the display means 5. According to that arrangement, when a user makes a route search, it is possible to assist the user in judging whether to permit the transit of a flat-rate pay area, which increases user convenience.

INDUSTRIAL APPLICABILITY

The present invention can be applied to a route search system and so forth of a mobile means to be charged in a flat-rate pay area.

The invention claimed is:

1. A route search system comprising:
a map data storing unit which stores a roadmap data containing, as the attribute of a road, whether the road is a road located within a flat-rate pay area where a fixed fare is charged on a mobile unit transiting the area regardless of the number of times the mobile unit transits the area within a fixed period of time;
a position detecting unit which detects the current position of the mobile unit;
a flat-rate pay area transit recording unit which stores that the mobile unit has transited the flat-rate pay area, when the current position detected by the position detecting unit came to be on a road located within the flat-rate pay indicated by the attribute of the roadmap data stored in the map data storing unit;
an input unit which inputs whether to permit the transit of the flat-rate pay area for each of first and second operation modes separately set by first and second users, the first and second users being different from one another; and a route calculating unit which is programmed to:
select the first operation mode when the route search system is employed by the first user,
calculate the optimum route to the destination within routes also including roads within the flat-rate pay area on the basis of the roadmap data stored in the map data storing unit, when operating according to the first operation mode regardless of whether it has been inputted by the input unit for the first operation mode that the transit of the flat-rate pay area is not permitted, if the flat-rate pay area transit recording unit stores that the mobile unit has transited the flat-rate pay area while operating in the first operation mode,
switch from the first to the second operation mode when the person employing the route search system changes from the first user to the second user, and
if the switch to the second operation mode occurs while the flat-rate pay area transit recording unit stores that the mobile unit transited the flat-rate pay area within the fixed period of time while operating in the first operation mode, calculate the optimum route to the destination within routes also including roads within the flat-rate pay area on the basis of the roadmap data stored in the map data storing unit while operating in the second operation mode, even if it is inputted by the input unit that the transit of the flat-rate pay area is not permitted upon operating in the second operation mode.

2. The route search system according to claim 1, further comprising an external information acquiring unit which acquires the charging information of the flat-rate pay area from outside,
wherein the route calculating unit calculates the optimum route to the destination according to the charging information acquired by the external information acquiring unit.

* * * * *